United States Patent
Kamba

(10) Patent No.: US 10,425,571 B2
(45) Date of Patent: Sep. 24, 2019

(54) FOCUSING AND IMAGE PICKUP APPARATUS, STORAGE MEDIUM, AND METHOD FOR CONTROLLING POSITIONING OF A FOCUS LENS

(71) Applicant: CANON KABUSHIKI KAISHA, Tokyo (JP)

(72) Inventor: Masaki Kamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 15/454,689

(22) Filed: Mar. 9, 2017

(65) Prior Publication Data

US 2017/0264812 A1  Sep. 14, 2017

(30) Foreign Application Priority Data

Mar. 10, 2016  (JP) .................................. 2016-046528

(51) Int. Cl.
- *H04N 5/232* (2006.01)
- *G02B 7/10* (2006.01)
- *H04N 5/225* (2006.01)

(52) U.S. Cl.
CPC ......... *H04N 5/23212* (2013.01); *G02B 7/102* (2013.01); *H04N 5/23245* (2013.01); *H04N 5/2254* (2013.01)

(58) Field of Classification Search
CPC ............. H04N 5/23212; H04N 5/2256; H04N 5/23245; H04N 5/2254; G02B 27/0068; G02B 7/102; G02B 5/208
See application file for complete search history.

(56) References Cited

U.S. PATENT DOCUMENTS

| | | | | |
|---|---|---|---|---|
| 2010/0086293 A1* | 4/2010 | Iwane | ...................... | G03B 3/00 396/91 |
| 2012/0300112 A1* | 11/2012 | Natsume | .................. | G03B 5/02 348/336 |
| 2015/0312484 A1* | 10/2015 | Kim | ................... | H04N 5/23296 348/240.3 |

FOREIGN PATENT DOCUMENTS

| | | | |
|---|---|---|---|
| JP | 06-121212 A | | 4/1994 |
| JP | 2000-266988 | * | 9/2000 |
| JP | 2004-347665 | * | 12/2004 |

* cited by examiner

*Primary Examiner* — Luong T Nguyen
(74) *Attorney, Agent, or Firm* — Cowan, Liebowitz & Latman, P.C.

(57) ABSTRACT

A focusing apparatus includes an acquisition unit configured to acquire locus data that indicates a position of a focus lens that depends on an object distance and a position of a zoom lens, and an adjustment value used to adjust the position of the focus lens on the locus data, a correction unit configured to correct the adjustment value based on an aberration of an optical system that includes the zoom lens and the focus lens, and a control unit configured to control the position of the focus lens based on the locus data and the corrected adjustment value.

15 Claims, 5 Drawing Sheets

FOCUSING AND IMAGE PICKUP APPARATUS, STORAGE MEDIUM, AND METHOD FOR CONTROLLING POSITIONING OF A FOCUS LENS

BACKGROUND OF THE INVENTION

Field of the Invention

The present invention relates generally to a focusing apparatus, and more particularly to a focusing apparatus configured to provide a zoom tracking control that moves a focus lens to an in-focus position along with a zooming operation.

Description of the Related Art

Many conventional video cameras etc. can provide a so-called zoom tracking operation configured to move a focus lens to a (supposed) in-focus position when a zooming lens is moved for zooming. The zoom tracking operation moves the focus lens along a cam locus curve stored in a memory for a corresponding zoom lens position.

The memory needs a high capacity to store cam locus curves at any object distances for the zoom tracking operation at the current object distance. Thus, the memory stores only a plurality of referenced cam locus curves corresponding to a plurality of referenced object distances and a cam locus curve at a non-referenced object distance is calculated through interpolation processing.

Japanese Patent Laid-Open No. ("JP") 6-121212 discloses a method for calculating a non-referenced cam locus curve using one referenced cam locus curve so as to reduce a data amount to be stored in the memory.

However, simply using the referenced cam locus curve disclosed in JP 6-121212 cannot fully correct individual scattering of a lens and a barrel and a spherical aberration etc. at a non-referenced object distance, and would deteriorate the tracking performance.

JP 6-121212 discusses an interpolation method of a cam locus curve but is silent about a correction of an aberration etc. at each object distance.

SUMMARY OF THE INVENTION

The present invention provides a focusing apparatus advantageous to a zoom tracking control.

A focusing apparatus according to one aspect of the present invention includes an acquisition unit configured to acquire locus data that indicates a position of a focus lens that depends on an object distance and a position of a zoom lens, and an adjustment value used to adjust the position of the focus lens on the locus data, a correction unit configured to correct the adjustment value based on an aberration of an optical system that includes the zoom lens and the focus lens, and a control unit configured to control the position of the focus lens based on the locus data and the corrected adjustment value.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
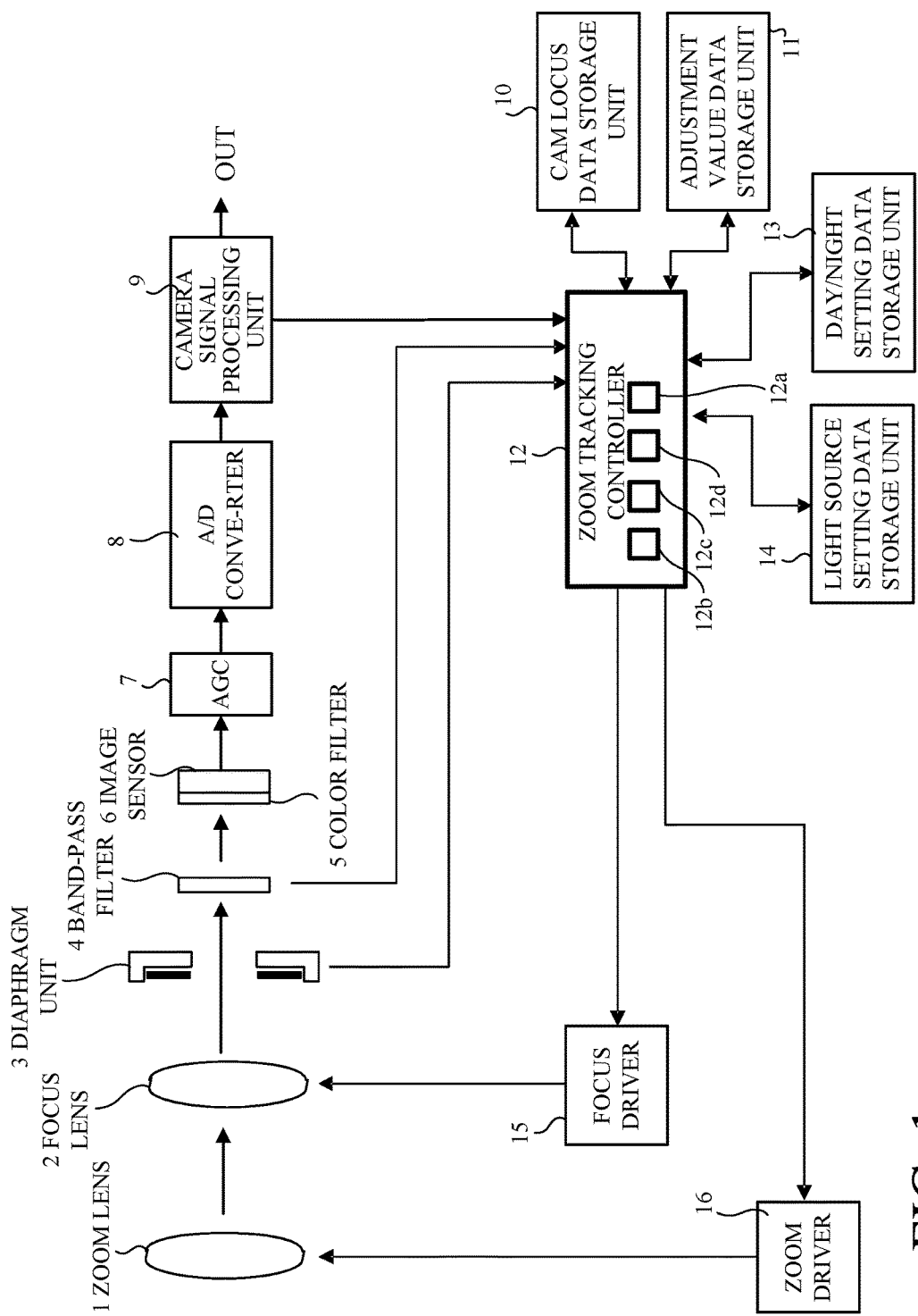
FIG. 1 is a configuration diagram of an image pickup apparatus according to a first embodiment of the present invention.

FIG. 1 is a configuration diagram of an image pickup apparatus according to a first embodiment of the present invention. The image pickup apparatus according to this embodiment includes an image pickup optical system. The image pickup optical system includes a plurality of optical elements, and forms an optical image of an object. The image pickup optical system according to this embodiment includes a zoom lens (magnification-varying lens) 1 configured to move in an optical axis direction and to change a focal length, a focus lens 2 configured to move in the optical axis direction for focusing, and a diaphragm unit 3 configured to adjust a light quantity. The optical image formed by the image pickup optical system is converted into an electric signal by an image sensor via a band-pass filter (referred to as a "BPF" hereinafter) 4, and a color filter 5. Some optical elements, such as the BPF 4, are inserted into and retreated from the optical path in the image pickup optical system although they are not explicitly so illustrated in FIG. 1. The electric signal (image signal) output from the image sensor 6 is gain-adjusted by an AGC 7, AD-converted by an A/D converter 8, and input into a camera signal processing unit 9. The camera signal processing unit 9 performs image processing, outputs an image signal to the outside, and calculates an evaluation value necessary for an autofocus action based on the image signal. Each lens may include two or more lenses.

Figure 2:
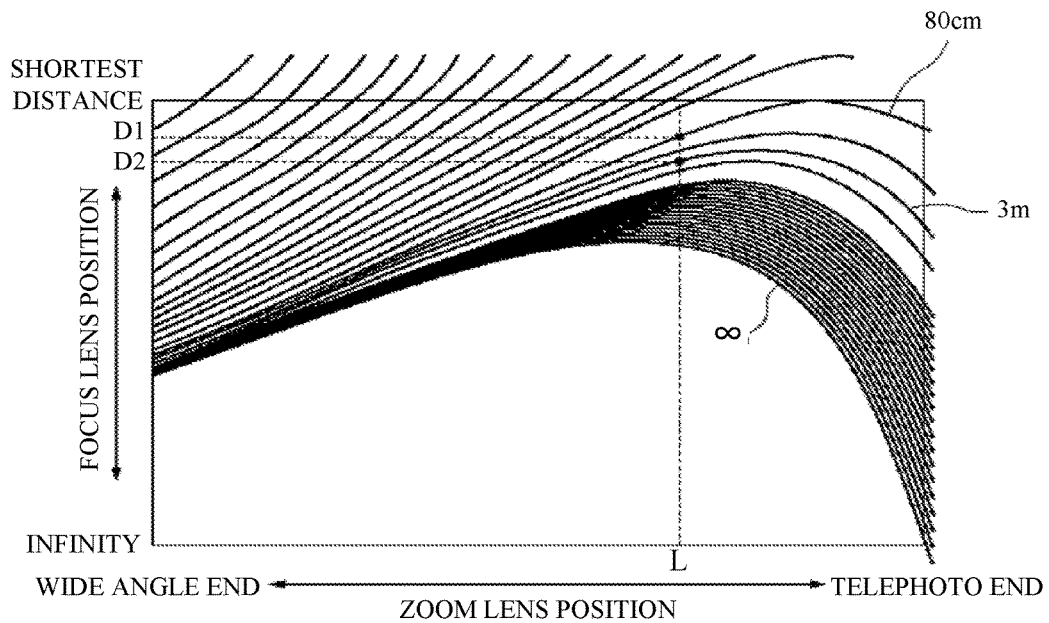
FIG. 2 is a conceptual diagram indicative of an in-focus cam locus depending on an object distance.

FIG. 2 is a cam locus curve representing a relationship between the position of the zoom lens 1 ("zoom lens position") and the (in-focus) position of the focus lens 2 ("focus lens position"). The abscissa axis denotes the zoom lens position from a minimum (wide angle (WIDE) end) of a zoom magnification ratio of the zoom lens to a maximum (telephoto (TELE) end) of the zoom magnification ratio. The ordinate axis denotes the focus lens position from the infinity object distance to the shortest object distance. Each curve in FIG. 2 represents a cam locus used to focus the object image on the image sensor with the focus lens position and the zoom lens position at the same object distance. The tracking control needs this cam locus curve information (cam locus data), and thus stores the cam locus data in a format of a table etc. in a memory, such as a cam locus data storage unit 10.

Since the memory needs a high capacity to store many object distances at fine resolution in the table, the memory stores only data of some referenced object distances in the table. A cam locus curve at a non-referenced object distance is calculated by interpolation processing.

The cam locus data storage unit 10 receives focus/zoom positions data from a zoom tracking controller 12, and finds cam locus data corresponding to the focus/zoom positions. As illustrated in FIG. 2, the cam locus data is made by dividing the object distance from the infinity to the shortest in-focus distance into a plurality of data, and by storing the referenced data in a table in the memory. The data of the object distance that is not stored in the table is calculated based on the interior division ratio between the closest shortest distance side cam locus information and the closest infinity side cam locus information using the referenced data and the focus/zoom position information. Thus, the cam locus data storage unit 10 serves as a storage unit configured to store the locus data representing a change of the in-focus position of the focus lens that depends on the object distance and the zoom lens position.

Figure 3:
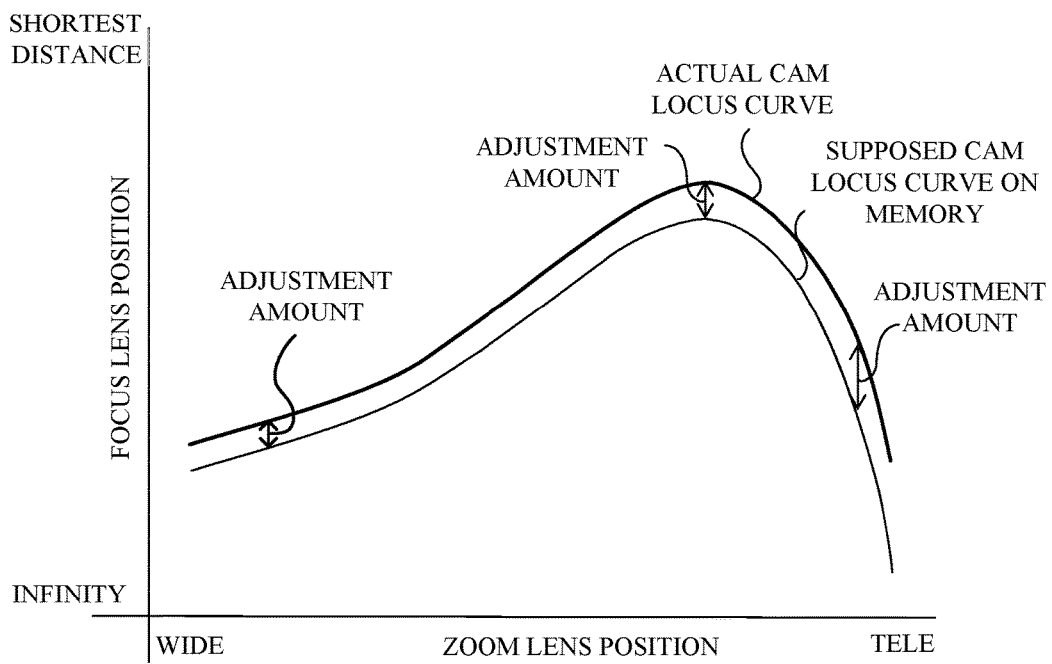
FIG. 3 is a view illustrating a design value of a cam locus curve.

Use of only the cam locus curve would cause a shift between the design value (cam locus data stored in the memory or calculated by the interpolation processing) and the actual in-focus position. FIG. 3 arranges the supposed or designed cam locus curve and the actual cam locus curve, and illustrates a difference of the in-focus position as an adjustment amount. The adjustment amount depends on the zoom lens position, and the adjustment amount needs to correspond to the zoom lens position. For one or more referenced object distances, an error at each zoom lens position is measured and stored as the adjustment data in a memory, such as an adjustment value data storage unit 11.

The adjustment data storage unit 11 stores the adjustment value used to correct a shift amount (caused by mechanical scattering for each image pickup apparatus) between the table value in the cam locus data at the infinity object distance in the cam locus data storage unit 10 and the actual in-focus position at the infinity object distance. As illustrated in FIG. 3, the adjustment value is different according to a zoom lens position, the memory stores adjustment values corresponding to a plurality of zoom lens positions in the table. Thus, the adjustment value data storage unit 11 serves as a storage unit configured to store the adjustment value used to adjust a shift amount between the (supposed) in-focus position of the focus lens in the cam locus data at a predetermined object distance (such as the infinity object distance) and the actual in-focus position of the focus lens at the predetermined object distance.

The memory needs a high capacity to store the adjustment data with a high resolution as in the cam locus curve. This embodiment provides a highly precise tracking control by storing correction data only at a plurality of points, by calculating an adjustment amount between two points through interpolation processing, and by correcting the cam locus curve.

The adjustment correction data storage unit 11 previously stores the adjustment data so as to correct the error from the design value caused by the individual scattering, but the tracking performance may deteriorate at a non-referenced object distance because a spherical aberration etc. cannot be fully corrected.

This is because the aberration amount is different according to each object distance and the aberration is left even after it is corrected when the adjustment data for the referenced object distance is applied as it is.

According to the present invention, the zoom tracking controller 12 corrects the cam locus data using the spherical aberration amount information and the adjustment data stored in the adjustment value correction data storage unit 11, as described later.

The zoom tracking controller 12 acquires the cam locus data from the cam locus data storage unit 10, and includes an acquisition unit 12a configured to acquire an adjustment value from the adjustment data storage unit 11, a calculation unit 12b configured to calculate a first focal length at a predetermined object distance (infinity) and a second focal length at the current object distance different from the predetermined object distance based on the zoom lens position and the focus lens position, and a correction unit 12c configured to correct the acquired adjustment value based on the aberration of the image pickup optical system at the current object distance. More specifically, the correction unit 12c corrects the acquired adjustment value based on the first focal length and the second focal length calculated by the calculation unit 12b. The zoom tracking controller 12 further includes a control unit 12d configured to control the focus lens position based on the acquired cam locus data and the corrected adjustment value. The acquisition unit 12a, the calculation unit 12b, the correction unit 12c, and the control unit 12d are separate components in this embodiment, but may be integrated with one another. The zoom tracking controller 12 constitutes a focusing apparatus configured to adjust a focus state of the optical system.

Thus, the zoom tracking controller 12 controls the focus/zoom positions based on the lens characteristic and the driving characteristic, and calculates the focal length based on the zoom/focus positions. More specifically, the focal length is calculated based on the zoom lens position, the focus lens position, and the cam locus data. The zoom tracking controller 12 calculates a shift caused by the spherical aberration as a variation amount of the object distance using information of the adjusted focal length at the infinity object distance and the focal length at the current object distance, and sets a correction coefficient for the adjustment value data. Since the aberration amount is different between the infinity object distance and the shortest object distance, the aberration is left due to the difference of the object difference even after the aberration is corrected when the adjustment data is applied as it is. The following Expression 1 expresses the adjustment value for the focus/zoom positions.

$$\text{Adjustment value} = \text{adjustment value (infinity)} \times ((\text{adjusted focal length/focal length at the current position})^2 \quad (1)$$

In other words, this embodiment obtains the corrected adjustment value by multiplying the adjustment value stored in the adjustment value data storage unit 11 by a square value of a ratio between a focal length at the predetermined object distance and a focal length at the current object distance different from the predetermined object distance.

The correction unit 12c adds the correction amount corresponding to the image pickup state to the adjustment value calculated with Expression (1). More specifically, the correction unit 12c adds the correction amount corresponding to the F-number of the diaphragm unit 3, the insertion/ejection state of the BPF 4, a state of the day/night setting data storage unit 13, and a light source setting data storage unit 14. The correction unit 12c calculates the focus/zoom positions using the cam locus data and the adjustment value to which the correction amount is added, and provides control commands to the focus driver 15 and the zoom driver 16. The focus driver 15 and the zoom driver 16 drive the focus lens and the zoom lens based on the signals from the zoom tracking controller 12. The first embodiment uses the infinity object distance for the adjustment value but may use a non-infinity object distance. The following Expression 2 is established where x is the object distance.

$$\text{Adjustment value} = \text{adjustment value } (x) \times ((\text{adjusted focal length/focal length at the current position})^2 \quad (2)$$

Figure 4:
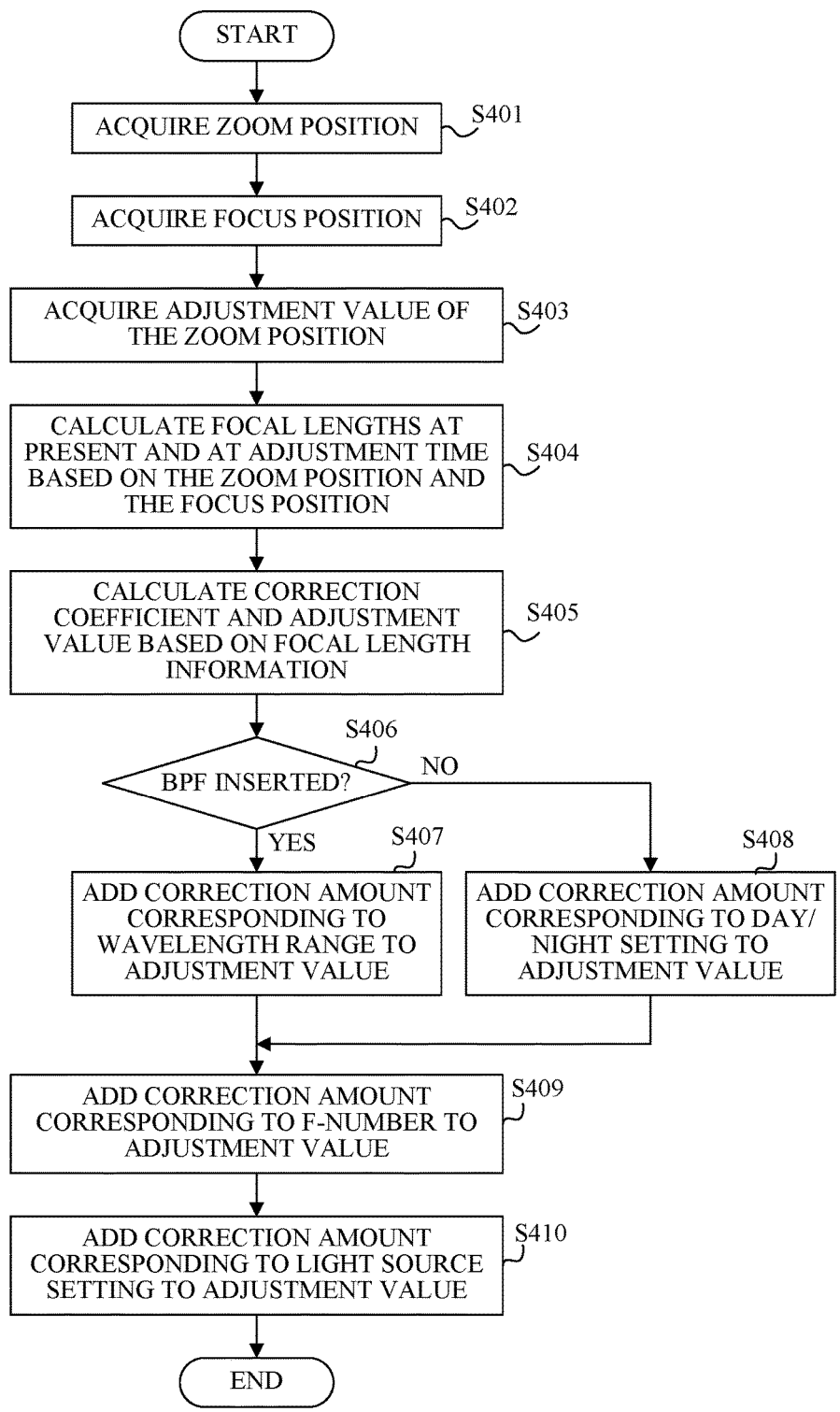
FIG. 4 is a focusing flowchart according to the first embodiment of the present invention.

Referring now to FIG. 4, a description will be given of a correction flow of the cam locus according to the first embodiment.

The zoom tracking controller 12 acquires the current zoom and focus positions (S401, S402). The current cam locus data is determined based on the cam locus data storage unit 10 by using information of the zoom/focus positions. At S403, the zoom tracking controller 12 acquires the adjustment value corresponding to the zoom position from the adjustment data storage unit 11. When there is no adjustment value for the zoom position in the table, the adjustment value is interpolated by using previous and next adjustment values (on the WIDE and TELE sides). Next, the zoom tracking controller 12 calculates the focal length at the current object distance and the adjusted focal length for the object distance based on the current zoom/focus positions (S404). The zoom tracking controller 12 calculates the correction coefficient for the adjustment data corresponding to the object distance using the focal length information and Expression (1), and determines the adjustment value (S405).

At S406, the zoom tracking controller 12 acquires the state of the BPF 4. When the BPF 4 is inserted, the zoom tracking controller 12 adds the difference between the BPF 4 and the infrared cut filter ("IRCF" hereinafter) as the correction value corresponding to the wavelength range, to the adjustment value (S407). In other words, when the BPF 4 is inserted into the optical path in the image pickup optical system (when the BPF is used), the zoom tracking controller 12 adds to the adjustment value difference amounts of the position and aberration of the focus lens from the use of the IRCF according to the wavelength range of the BPF 4. That is, depending on the wavelength range of the light in the incident light that transmits the BPF, the zoom tracking controller 12 adds the difference amounts of the position and aberration of the focus lens between the image pickup state with the BPF and the image pickup state with the IRCF, to the corrected adjusted value. When the BPF is not inserted, the zoom tracking controller 12 adds the correction amount corresponding to the setting value of the day/night setting data storage unit 13 to the adjustment value (S408).

Moreover, the zoom tracking controller 12 acquires the state of the diaphragm unit 3, and adds the difference from the open aperture state as the correction amount, to the adjustment value corresponding to the F-number (S409). In other words, in the image pickup state that is not the open aperture state, the zoom tracking controller 12 adds the difference amount of the aberration from the open aperture state to the corrected adjustment value corresponding to the F-number of the diaphragm unit 3. Moreover, the zoom tracking controller 12 adds the difference from use of the white light as the correction amount to the adjustment value in accordance with the setting value in the light source setting data storage unit 14 (S410). That is, when the light source is set according to the peripheral environment, the zoom tracking controller 12 adds the difference value of the aberration from the white light to the adjustment value. The zoom tracking controller 12 adds the difference amount of the aberration from the white light to the corrected adjustment value corresponding to the light source setting in the image pickup state that sets the light source. This configuration determines the adjustment value for the current cam locus data. Thus, the tracking performance of the cam locus curve is prevented from deteriorating even at a non-referenced object distance by adding the influential factor to the adjustment value.

The present invention corrects the cam locus information using the adjustment value used to correct the cam locus information at the predetermined object distance, and the correction coefficient calculated based on the focal length information corresponding to the object distance and Expression 1 or 2.

This configuration can restrain the aberration from being left even after the aberration is corrected, and provide a high-performance tracking control at a non-referenced object distance without changing the optical or mechanical configuration. Therefore, the tracking performance of the cam locus can be maintained even at the non-referenced object distance.

The present invention is not limited to this embodiment, and various variations and modifications may be made without departing from the scope of the present invention.

For example, data stored in the cam locus data storage unit 10 may be the cam locus information corresponding to the referenced object distance similar to JP 6-121212. In this case, the cam locus data storage unit 10 can calculate the cam locus information corresponding to the non-referenced object distance using the cam locus information, the zoom lens position, and the focus lens position.

The focusing apparatus according to this embodiment is applied to a lens integrated type image pickup apparatus in which the image pickup optical system (image pickup lens) is integrated with the image pickup apparatus body. However, the present invention is not limited to this embodiment, and is applicable to an image pickup system (optical apparatus) that includes an image pickup apparatus body, and an interchangeable lens detachably attached to the image pickup apparatus body.

Second Embodiment

Figure 5:
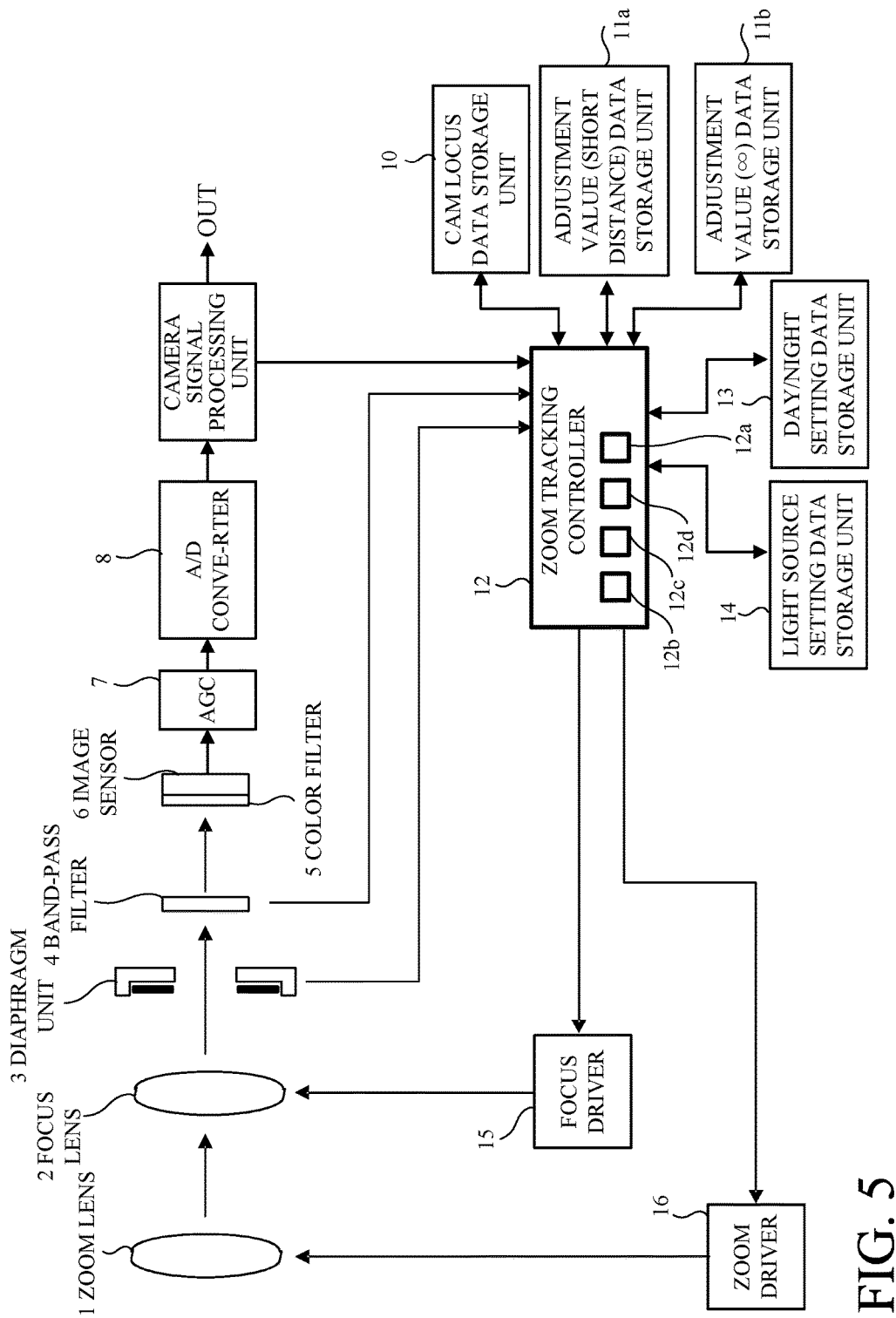
FIG. 5 is a configuration diagram of an image pickup apparatus according to a second embodiment of the present invention.

FIG. 5 is a configuration diagram of a second embodiment according to the present invention.

An image pickup apparatus having a sufficient memory capacity can narrow a correcting range of the object distance by storing various adjustment data. As the correction range widens, the value of the correction coefficient increases and the influence on the correction precision reduces. In storing a plurality of adjustment data of the referenced object distance, it is necessary for the current object distance to consider the value of the adjustment data to be used.

A description of a component corresponding to that in the first embodiment will be omitted. The adjustment value (shortest distance) data storage unit 11a stores an adjustment value used to correct a shift amount (caused by mechanical scattering for each image pickup apparatus) between the actual in-focus position and the table value in the cam locus data storage unit 10 for the cam locus at the shortest object distance. In other words, the adjustment value (shortest distance) data storage unit 11a serves as a storage unit configured to store a first adjustment value used to adjust a shift amount between the in-focus position of the focus lens in the cam locus data at a first object distance and the actual in-focus position of the focus lens at the first object distance. Similarly, the adjustment value (infinity) data storage unit 11b stores an adjustment value for the cam locus at the infinity object distance. In other words, the adjustment value (infinity) data storage unit 11b serves as a storage unit configured to store a second adjustment value used to adjust a shift amount between the in-focus position of the focus lens in the cam locus data at a second object distance and the actual in-focus position of the focus lens at the second object distance. While the second embodiment uses the shortest object distance and the infinity object distance, a plurality of different object distances may be used instead.

The acquisition unit 12a in the zoom tracking controller 12 acquires the first adjustment value from the adjustment value (shortest distance) data storage unit 11a and the second adjustment value from the adjustment value (infinity) data storage unit 11b.

The correction unit 12c corrects the third adjustment value based on a relationship among the shortest object distance (first object distance), the infinity object distance (second object distance), and the current object distance, and the acquired first and second adjustment values. The correction unit 12c corrects the third adjustment value based on the first focal length at the first object distance and the second focal length at the second object distance calculated by the calculation unit 12b.

Figure 6:
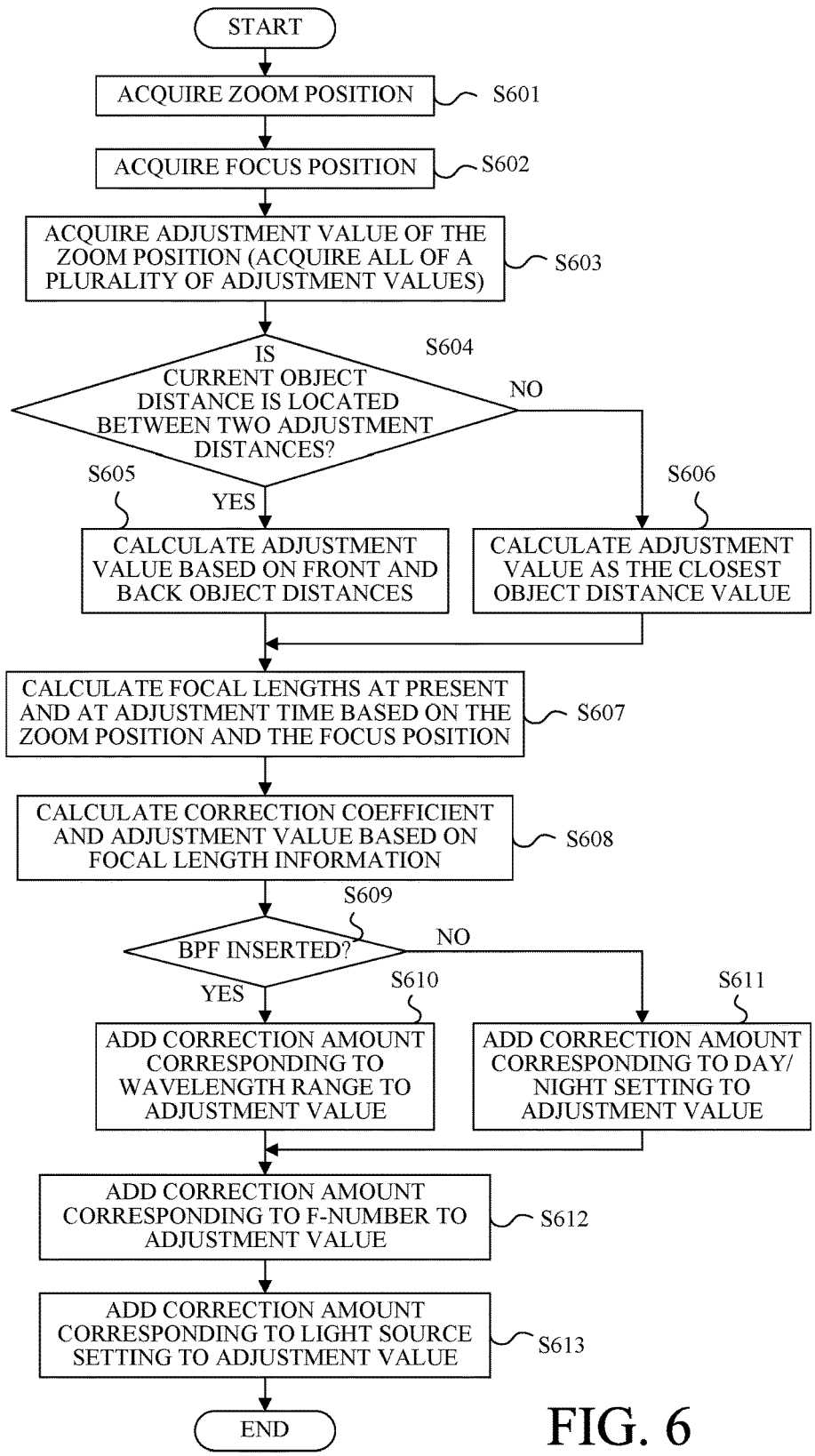
FIG. 6 is a focusing flowchart according to the second embodiment of the present invention.

Referring now to FIG. 6, a description will be given of a correction flow of the cam locus according to the second embodiment. A description of the flow common to the first embodiment will be omitted. After S601 and S602 corresponding to S401 and S402, the zoom tracking controller 12 acquires the adjustment values from the adjustment value data (shortest distance) storage unit 11a and the adjustment value (infinity) data storage unit 11b based on the current zoom position (S603). When there is no adjustment value at the zoom position in the table, the adjustment value is interpolated by using previous and next adjustment values (on the WIDE and TELE sides). At S604, the zoom tracking controller 12 compares the current object distance with two types of adjusted object distances. When the current object distance is located between two types of adjusted object distances (S605), the adjustment value utilizes the average value. In other words, this embodiment sets the average between the first adjustment value and the second adjustment value acquired from the storage unit, to the third adjustment value. Since the performance variation depends on a distance and each individual lens, a weighted value may be utilized. In that case, the zoom tracking controller 12 may set to the third adjustment value a value made by weighting the first adjustment value and the second adjustment value with a relationship among the shortest object distance (first object distance), the infinity object distance (second object distance), and the current object distance. The adjustment value at S608 may be the weighted and averaged value. When the current object distance is not located between the two types of adjusted object distances (S606), a closer one of the shortest adjustment value and the infinity adjustment value may be utilized. Use of a small memory capacity can reduce the influence of the object distance on the correction precision.

This configuration can restrain the aberration from being left after the aberration is corrected, and provide a high-performance tracking control at a non-referenced object distance without changing the optical or mechanical configuration. Therefore, the tracking performance of the cam locus can be maintained even at the non-referenced object distance. Thus, the present invention can provide a focusing apparatus advantageous the zoom tracking control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-046528, filed Mar. 10, 2016, which is hereby incorporated by reference herein in its entirety.

What is claimed is:

1. A focusing apparatus comprising:
   a memory configured to store locus data that indicates a position of a focus lens that depends on an object distance and a position of a zoom lens, and an adjustment value corresponding to a predetermined object distance and used to adjust the position of the focus lens on the locus data; and
   at least one processor which functions as:
   a correction unit configured to correct the adjustment value based on an aberration of an optical system that includes the zoom s and the focus lens; and
   a control unit configured to control the position of the focus lens based on the locus data and the corrected adjust ent value, wherein the correction unit corrects the adjustment value corresponding to the predetermined object distance based on the aberration at an object distance different from the predetermined object distance.

2. The focusing apparatus according to claim 1, wherein the adjustment value corresponding to the predetermined object distance is used to adjust a shift amount between the position of the focus lens on the locus data at the predetermined object distance and an actual in-focus position of the focus lens at the predetermined object distance.

3. The focusing apparatus according to claim 1, wherein the processor further functions as a calculation unit configured to calculate a first focal length at the predetermined object distance and a second focal length at the object distance different from the predetermined object distance based on the position of the zoom lens and the position of the focus lens,
   wherein the correction unit corrects the adjustment value based on the aberration at the object distance different from the predetermined object distance by correcting the adjustment value using the first focal length and the second focal length.

4. The focusing apparatus according to claim 3, wherein the calculation unit calculates the first focal length and the second focal length.

5. The focusing apparatus according to claim 3, wherein the correction unit corrects the adjustment value based on the aberration at the object distance different from the predetermined object distance by multiplying the adjustment value by a square value of a ratio between the first focal length and the second focal length.

6. The focusing apparatus according to claim 1, wherein the memory is configured to store a first adjustment value used to adjust a shift amount between the position of the focus lens in the locus data at a first object distance and an actual in-focus position of the focus lens at the first object distance, and a second adjustment value used to adjust a shift amount between the position of the focus lens in the locus data at a second object distance different from the first object distance and the actual in-focus position of the focus lens at the second object distance,
wherein the correction unit calculates a third adjustment value based on a relationship among the first object distance, the second object distance, and the current object distance, and the first and second adjustment values, and corrects the third adjustment value based, on a first focal length at the first object distance and a second focal length at the second object distance.

7. The focusing apparatus according to claim 6, wherein the third adjustment value is an average value between the first adjustment value and the second adjustment value.

8. The focusing apparatus according to claim 6, wherein the third adjustment value is a value made by weighting the first and second adjustment values with a value that depends on the relationship.

9. The focusing apparatus according to claim 1, wherein the correction unit applies a correction amount corresponding to an image pickup state to the corrected adjustment value.

10. The focusing apparatus according to claim 9, wherein the correction unit adds, in an image pickup state in which a band-pass filter is used, to the corrected adjustment value difference values of the position and an aberration of the focus lens from an image pickup state in which an infrared cut filter used according to a wavelength range of light in incident light which transmits the band-pass filter.

11. The focusing apparatus according to claim 9, wherein the correction unit adds, in an image pickup state in which a diaphragm is not an open aperture state, a difference amount of an aberration from an open aperture state according to an F-number of the diaphragm to the corrected adjustment value.

12. The focusing apparatus according to claim 9, wherein the correction unit adds in an image pickup state in which a light source is set, a difference amount of an aberration from white light according to a setting of the light source to the corrected adjustment value.

13. A age pickup apparatus comprising:
an image sensor; and
a focusing apparatus, wherein the focusing apparatus includes:
a memory configured to store locus data that indicates a position of a focus lens that depends on an object distance and a position of a zoom lens, and an adjust ent value corresponding to a predetermined object distance and used to adjust the position of the focus lens on the locus data, and
at least one processor which functions as:
a correction unit configured to correct the adjustment value based on an aberration of an optical system that includes the zoom lens and the focus lens; and
a control unit configured to control the position of the focus lens based on the locus data and the corrected adjustment value, wherein the correction unit corrects the adjustment value corresponding to the predetermined object distance based on the aberration at an object distance different from the predetermined object instance.

14. A control method of a focusing apparatus, comprising the steps of:
acquiring locus data that indicates a position of a focus lens that depends on an object distance and a position of a zoom lens, and an adjustment value corresponding to a predetermined object distance and used to adjust the position of the focus lens on the locus data,
correcting the adjustment value based on an aberration of an optical system that includes the zoom lens and the focus lens at an object distance different from the predetermined object distance, and
controlling the position of the focus lens based on the loco s data and the core adjustment value.

15. A non-transitory computer readable storage medium storing a program that enables a computer to execute a method that includes the steps of:
acquiring locus data that indicates a position of a focus lens that depends on an object distance and a position of a zoom lens, and an adjustment value corresponding to a predetermined object distance and used to adjust the position of the focus lens on the locus data,
correcting the adjustment value based on an aberration of an optical system that includes the zoom lens and the focus lens at an object distance different from the predetermined object distance, and
controlling the position of the focus lens based on the locus data and the corrected adjustment value.

* * * * *